United States Patent
Lahm et al.

[15] 3,703,699
[45] Nov. 21, 1972

[54] TRIMMER POTENTIOMETER HAVING MEANS FOR LEAD SCREW MISALIGNMENT COMPENSATION

[72] Inventors: James Lahm, Fullerton; Robert D. Hill, Jr., West Covina, both of Calif.

[73] Assignee: Spectrol Electronics Corporation, City of Industry, Calif.

[22] Filed: Nov. 12, 1971

[21] Appl. No.: 198,387

[52] U.S. Cl. ................................. 338/180, 338/183
[51] Int. Cl. .............................................. H01c 9/02
[58] Field of Search ...... 338/118, 160, 176, 180, 183, 338/202

[56] References Cited

UNITED STATES PATENTS

| | | | |
|---|---|---|---|
| 3,550,059 | 12/1970 | Barden | 338/176 |
| 3,639,880 | 2/1972 | Oka | 338/176 |
| 3,597,719 | 8/1971 | Martin | 338/180 |

*Primary Examiner*—Lewis H. Myers
*Assistant Examiner*—Gerald P. Tolin
*Attorney*—Harry G. Martin, Jr. et al.

[57] ABSTRACT

A trimmer potentiometer having a housing with an elongated interior cavity therein is provided with an axially extending lead screw which is subject to alignment tolerances during assembly. A substrate member having parallel resistor and collector elements on a flat surface thereof substantially closes an open side of the interior cavity of the housing. A pair of axially extending shoulders are defined by opposite side walls of the interior cavity which are spaced from and oppose a substantially flat surface on the substrate. A wiper member has a pair of flanges at opposite sides thereof disposed between the substrate member and the shoulders of the housing. The bottom surface of the wiper member is formed with a pair of spaced runners having a surface which slides along the substrate member. The other side of the flange on the substrate forms a shoulder overlying and opposing the shoulder on the housing member. A pair of spaced, resilient, conical protuberances are formed on both of the shoulders on the wiper member and engage and are compressed against the shoulders on the housing member. The compression of the protuberances forces the runner members into tight engagement with the substrate and prevents a misaligned lead screw from causing a wobbling or rocking motion to the wiper member during adjustment of the trimmer potentiometer.

4 Claims, 4 Drawing Figures

3,703,699

TRIMMER POTENTIOMETER HAVING MEANS FOR LEAD SCREW MISALIGNMENT COMPENSATION

BACKGROUND OF THE INVENTION

This invention relates to trimmer potentiometers, particularly those referred to as rectilinear trimmers which include an axially extending lead screw for positioning a wiper element at a desired location along the length of a resistance element.

Trimmer potentiometers are characteristically subject to moderate tolerances in assembly of the lead screw into the trimmer housing. In the past, it has been frequent practice to suspend the wiper member from the lead screw for ease of assembly. Consequently, slight misalignment of the lead screw during its assembly with the housing could cause uneven motion of the wiper and in extreme cases could cause the wiper to bind due to interference with the housing walls, thereby causing a substantial number of rejects during final inspection.

Another problem which has frequently been experienced with trimmer potentiometers is the tendency for there to be substantial backlash or hysteresis in setting the resistance value. Furthermore, trimmer potentiometers have often exhibited excessive contact resistance variation or electrical noise differing greatly from sample to sample. In accordance with this invention, it has been discovered that the backlash problem, the lack of precise setability and the apparent contact resistance variation or noise problem can all be traced to minute wobbling or rocking of the wiper member during rotation of the lead screw. This effect can be greatly magnified if the wiper member is suspended from the lead screw and the lead screw is slightly out of alignment. An extreme misalignment can cause the binding problem previously referred to.

Accordingly, it is a principal object of this invention to provide a trimmer potentiometer construction which avoids the backlash, setability, noise and binding problems which have plagued prior designs and in which precise alignment of the lead screw is unnecessary for proper operation.

SUMMARY OF THE INVENTION

A trimmer potentiometer is provided with a housing having an internal cavity which defines a pair of axially extending flat shoulders on either side thereof. A shoulder formed in the housing is spaced from the flat surface of a substrate member, which carries the resistance element, and which closes an open side of the housing. An axially extending lead screw member is disposed in the housing and a wiper element having a pair of flanges thereon is assembled in threaded engagement with the lead screw. The flanges on the wiper member are disposed between the shoulder on the housing and the substrate member. A pair of spaced runner elements are formed on the wiper which engage a flat surface on the substrate and the shoulders on the wiper overlie the shoulders formed on the housing. A clearance space is provided between the wiper member and the walls of the housing so that the wiper can accommodate a misalignment tolerance in the positioning of the lead screw without binding. A plurality of resilient protuberances, which are preferably conical, are compressed between the shoulders on the housing and the shoulders on the wiper so as to resiliently urge the runner elements into firm sliding engagement with the flat surface of the substrate, thereby preventing rocking or tilting motions which could give rise to electrical noise and backlash during adjustment of the trimmer.

Since the wiper is retained in the housing by the resiliency of the protuberances and is free to move with respect to the lead screw, neither misalignment of the lead screw or other manufacturing tolerances give rise to the backlash and other problems which have caused prior trimmers to exhibit unacceptable performance.

DESCRIPTION OF THE PREFERRED EMBODIMENT

Figure 4:
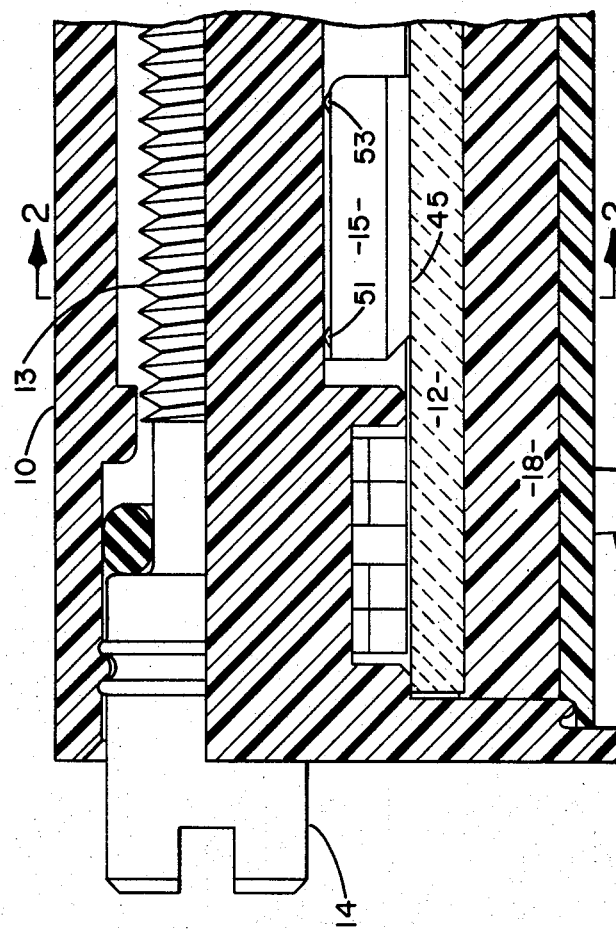
FIG. 4 is a fragmentary displaced cross sectional view of a trimmer along line 4—4 of FIG. 2.
Figure 1:
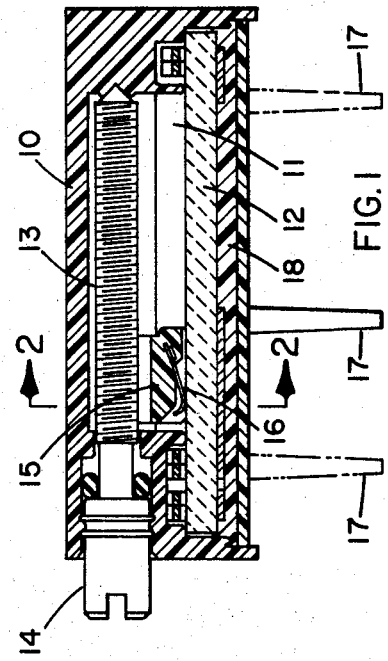
FIG. 1 is an axial cross section through a trimmer potentiometer in accordance with this invention.

Referring particularly to FIG. 1, there is illustrated a trimmer potentiometer having a housing 10 with an interior cavity 11 defined therein. Interior cavity 11 is open on the bottom side thereof and the opening is closed by a substrate member 12 which carries the resistance element. A lead screw member 13 axially extends through cavity 11 and is suitably journalled at its ends for rotation within the housing. Preferably the lead screw member is ultrasonically inserted in a thermoplastic housing which flows about the ends of the lead screw to retain it in a desired position with reasonable accuracy. It will be appreciated, however, that some variation in the exact location of the lead screw in the housing will be experienced in manufacture. A wiper member 15 carrying resistance contact element 16 is assembled in threaded engagement with lead screw 13 for axial translation within the housing. Suitable terminal means 17 are provided to make electrical contact with the ends of the resistance element and with the contact element from the exterior of the housing. The substrate member is secured and sealed in engagement with the housing by a suitable means such as staking and potting with epoxy resin 18 which may also form a vapor seal to prevent the entrance of moisture into the housing after assembly.

Figure 2:
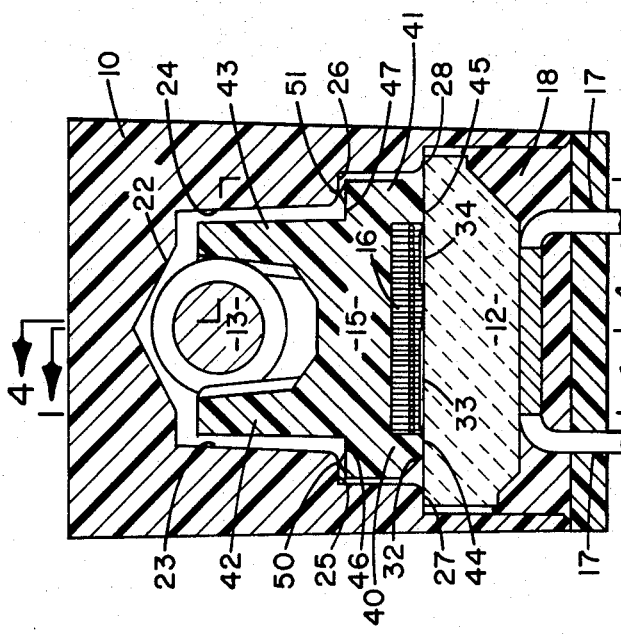
FIG. 2 is a transverse cross section taken substantially on line 2—2 of FIG. 1.
Figure 3:
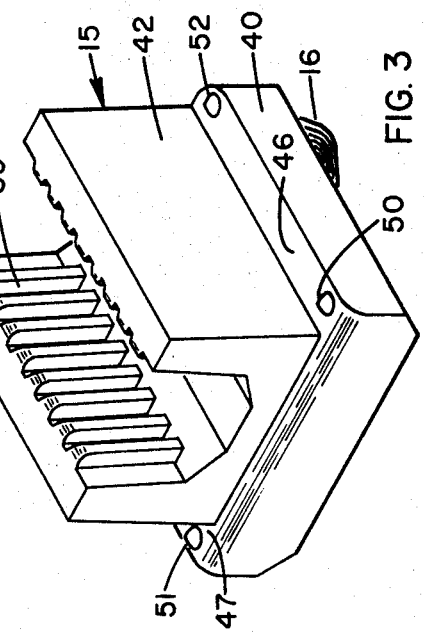
FIG. 3 is a perspective view of a wiper element in accordance with this invention.

Housing 10, as will be more particularly seen from FIG. 2, has an internal cavity defined by a top wall 22 which preferably has an upwardly extending groove of triangular cross section to assist in alignment of the lead screw during its assembly in the housing. Opposite, axially extending side walls 23 and 24 and suitable end walls define the axially extending cavity in the housing member which has an open bottom side. Opposite side walls 23 and 24 include also outwardly extending shoulder portions 25 and 26 which extend axially substantially the full length of the housing member. Shoulders 25 and 26 are substantially flat and face the open side of housing 10. An additional outwardly extending ledges 27, 28 are formed on opposite sides of the cavity within the housing 10 on which substrate 12 rests. Substrate 12 is held in tight engagement with ledges 27, 28 by a layer of solidified epoxy resin 18.

Substrate 12 has a substantially flat upper surface 32 facing the interior cavity in housing 10. Axially extending resistor element 33 and collector element 34 are formed in spaced parallel relation on the flat surface of substrate 12.

Wiper member 15 includes a pair of upwardly extending flexible ribs 42, 43 having suitable thread-like means 39, such as vertical ribs, formed thereon to engage the exteriorly formed threads on lead screw 13. Ribs 42 and 43 are preferably flexible so that they can expand away from threads on the lead screw and produce ratcheting action upon continued rotation of the lead screw when the wiper has been moved to the ends of its permissible travel within the housing. Thread means 39 on the wiper allow unrestricted vertical motion between the lead screw and the wiper so that the wiper is not suspended from the lead screw but is free to follow its prescribed motion irrespective of misalignment of the lead screw in the housing.

Wiper 15 is also provided with a pair of axially extending flange elements 40 and 41 on both sides thereof. The bottom side of flanges 40 and 41 form a pair of spaced axially extending narrow runners which are substantially co-planar with and rest against flat surface 32 of substrate 12. The upper side of flanges 40, 41 form a pair of axially extending shoulders 46 and 47 which face toward and overlie shoulders 25 and 26 respectively on the housing member.

Protuberances 50, 51, 52, 53 are formed on shoulders 46, 47 of the wiper member. The protuberances are resiliently compressed between the complementary overlying portions of the shoulders on the housing and wiper members. Consequently, the protuberances force runner elements 44 and 45 of wiper 15 firmly against the flat surface 32 of substrate 12 and prevent the wiper from rocking or tilting with respect to the substrate. Preferably, the protuberances are integrally formed of a plastic material which composes wiper member 42 and may be generally hemispherical or conical in shape in their uncompressed condition. The protuberances are made of such a size that they will be compressed and urge the wiper member into firm sliding engagement with the flat surface of the substrate member under any allowable dimensional tolerance conditions for the trimmer components. Typically the protuberances will be on the order of about five one-thousandths of an inch thick for a three-fourths inch long trimmer potentiometer. The protuberances have a very small area of contact with the housing shoulders compared to the overlying area of the shoulders in the housing and wiper so they assist in providing a low friction and smooth travel to the movement of the wiper within the housing. At the same time the resiliency of the protuberances acts like a small spring to prevent the wiper from following variations in the location of the lead screw and to force the wiper to follow along the flat surface of the substrate. It is preferred that a pair of spaced protuberances be formed on each of the shoulders of the wiper close to the ends thereof to minimize friction and maximize stability of the wiper.

The operation of a trimmer made in accordance with this invention will become apparent from the foregoing description. The clearance which exists between the wiper member and the walls of the housing allows the wiper to cock itself within the housing to the extent necessary to accommodate some sideways misalignment of the lead screw. Since the threaded means on the wiper is not employed to suspend the wiper from the lead screw, the wiper may move vertically with respect to the lead screw and accommodate tolerances in the vertical position thereof. The resiliency of the protuberances formed on the shoulders of the wiper maintain it in firm engagement against the substrate so that the contact element 16 rides smoothly along the resistor and collector tracks when the lead screw is rotated. Since the vertical position of the wiper member within the housing is solely governed by the engagement of the runner elements of the wiper against the flat surface of the substrate, the lead screw produces only translational motion of the wiper and is incapable of causing rocking or tilting movement which may impair the electrical characteristics or mechanical setability of the trimmer.

While a preferred embodiment of this invention has been described for purposes of illustration, it will be appreciated that this invention may be otherwise embodied within the scope of the following claims.

We claim:

1. A variable resistor comprising:
A. an elongated housing member having walls defining an axially extending hollow interior cavity having an open side;
B. an elongated substrate member firmly secured to said housing member, said substrate member having a resistance element disposed on a substantially flat surface thereof facing and substantially covering the open side of the interior cavity of said housing;
C. an axially extending threaded lead screw member disposed in the cavity in said housing member and extending therefrom to enable manipulation of the lead screw from the exterior of the housing;
D. a wiper member disposed in the cavity in said housing, said wiper member engaging said lead screw and having a wiper contact element engaging the resistance element on said substrate member;
E. terminal means for making electrical contact with said resistance element and said contact element from the exterior of said housing; wherein the improvement comprises:
F. said housing having a pair of axially extending substantially flat shoulders located on opposite sides of the cavity in the housing, said shoulders facing toward the substantially flat face of the substrate member and being spaced therefrom;
G. said wiper member having a pair of flanges on opposite sides thereof, said flanges being disposed between the shoulders on the housing member and the flat surface of the substrate member and defining a pair of substantially flat shoulders overlying and facing the flat shoulders on the housing member, said wiper member also having a flexible spaced pair of transversely extending ribs for disengageably receiving the threaded lead screw therebetween, the sides of said wiper member being spaced from the walls of the cavity in the housing member to allow the wiper member to laterally position itself within said housing in spaced relation with the walls of the interior cavity thereof when assembled on the lead screw, thereby being enabled to accommodate some misalignment of the lead screw;

H. a pair of spaced smooth runner elements on said wiper member, both of the runner elements having a surface substantially co-planar with and engaging the substantially flat face of the substrate member, said wiper contact element being disposed on said wiper member between said spaced runner elements;

I. a pair of resilient smooth protuberances extending from the shoulder on one of said wiper and housing members and extending to the shoulder on the other of said members, one of said protuberances being disposed on each side of the cavity in said housing member, said protuberances having an area of contact with said other member which is relatively small with respect to the overlying area of the shoulders on said members, said protuberances having a relaxed dimension greater than the distance between the adjacent facing shoulders on said housing and said wiper members so as to be resiliently compressed therebetween, said protuberances resiliently urging said wiper runner elements into firm sliding engagement with the substantially flat surface of said substrate member to prevent tilting motion of said wiper member with respect to both the shoulders on said housing member and the flat surface of said substrate member while accommodating transverse motion of the wiper member with respect to said lead screw, so that the lead screw controls only the axial translatory motion of the wiper member in the housing and whereby a tolerance in alignment of the lead screw can be accommodated without binding or rocking of the wiper member during adjustment thereof.

2. A variable resistor as defined in claim 1 wherein said protuberances are disposed on the shoulders of said wiper member.

3. A variable resistor as defined in claim 1 wherein said protuberances are substantially conical in shape.

4. A variable resistor as defined in claim 1 wherein said protuberances comprise an axially spaced pair of protuberances integral with and disposed on both of the shoulders of said wiper member.

* * * * *